United States Patent [19]

Gutierrez Atencio

[11] Patent Number: 4,468,153
[45] Date of Patent: Aug. 28, 1984

[54] SYMMETRIC TIDAL STATION

[76] Inventor: Francisco J. Gutierrez Atencio, Estafeta Dr. Garcia, 3101 Diamanta-E. Rios, Argentina

[21] Appl. No.: 377,675

[22] Filed: May 12, 1982

[51] Int. Cl.³ .............................................. E02B 9/00
[52] U.S. Cl. ...................................... 405/78; 290/52; 405/75
[58] Field of Search .................................. 405/75–78, 405/104, 106, 127; 290/52; 415/219 R, 1

[56] References Cited

U.S. PATENT DOCUMENTS

| 1,486,186 | 2/1924 | Harza | 290/52 |
| 2,783,392 | 2/1957 | Corbiere | 290/52 |
| 2,945,960 | 7/1960 | Obrist | 290/52 |
| 3,097,491 | 7/1963 | Pugh | 405/78 |
| 3,184,218 | 5/1965 | Hochwalt et al. | 415/117 |
| 3,187,190 | 6/1965 | Lang | 290/52 X |
| 4,073,146 | 2/1978 | Atencio | 405/78 |
| 4,102,599 | 7/1978 | Ziegler | 415/219 R |
| 4,120,602 | 10/1978 | Megnint | 415/1 |

FOREIGN PATENT DOCUMENTS

| 1002693 | 2/1957 | Fed. Rep. of Germany | 405/78 |
| 518877 | 6/1921 | France | 405/78 |
| 909170 | 11/1942 | France | 290/52 |

*Primary Examiner*—Dennis L. Taylor
*Attorney, Agent, or Firm*—Emory L. Groff, Jr.

[57] ABSTRACT

A tidal station includes a plurality of turbine/generator sets removably insertable along the central axis of a caisson to provide a symmetrical installation. Fixedly disposed basin side and sea side diffusers include inlets alternately juxtaposed opposite ends of the turbine/generator sets as the sets are rotatably displaced 180 degrees between ebb and flood tides. Ballasting/deballasting structure contained in the caisson permits self-portability of the caisson to its site and subsequent positioning thereat.

23 Claims, 10 Drawing Figures

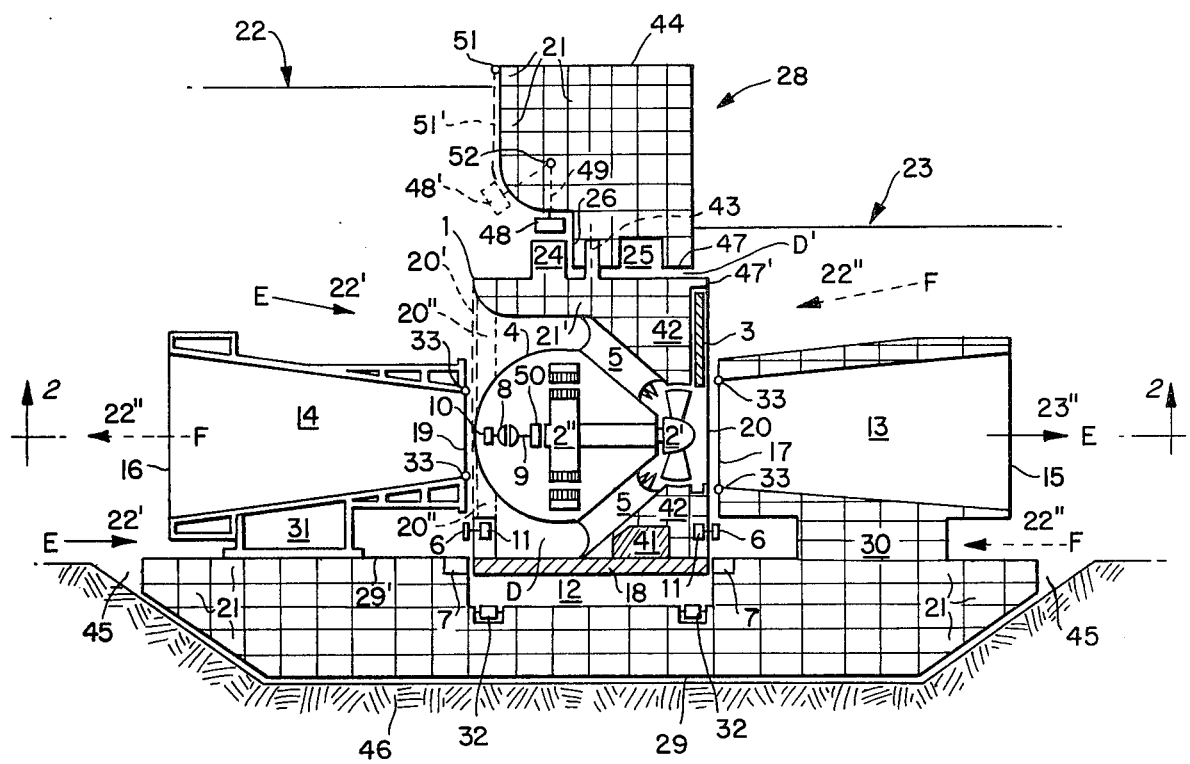

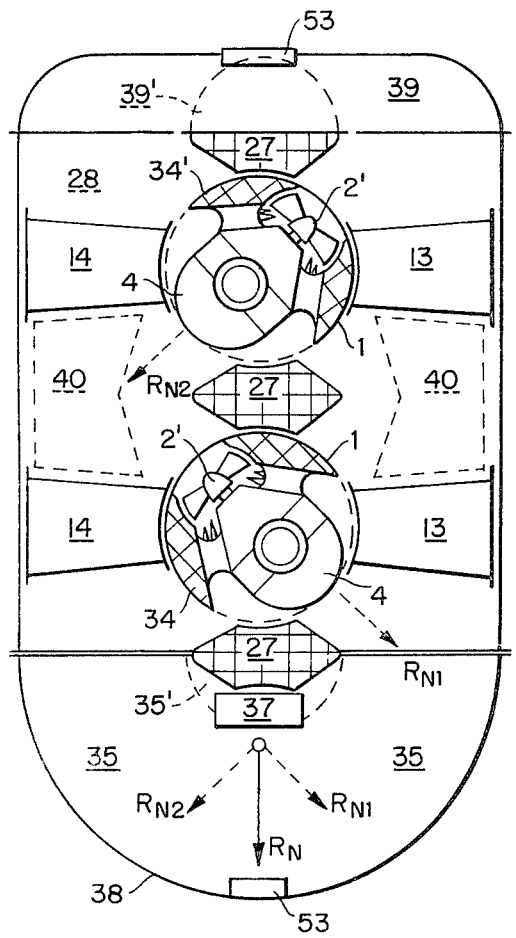
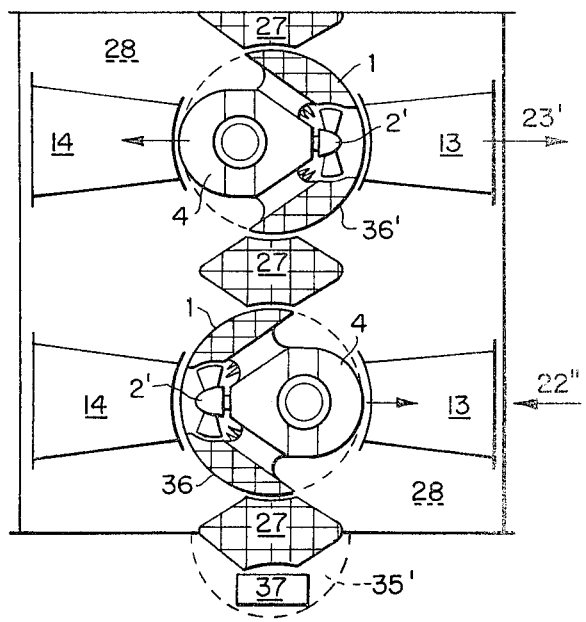
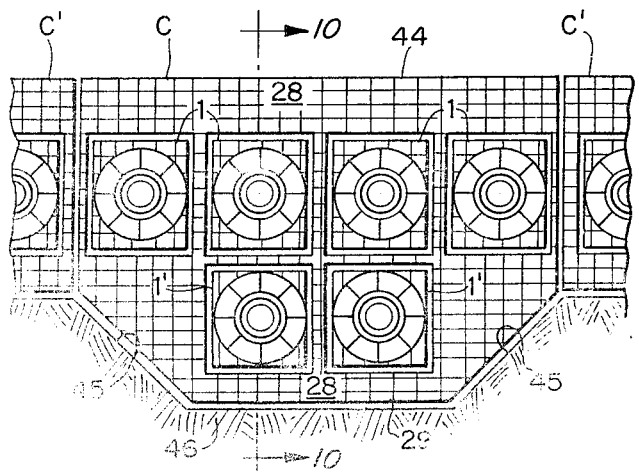
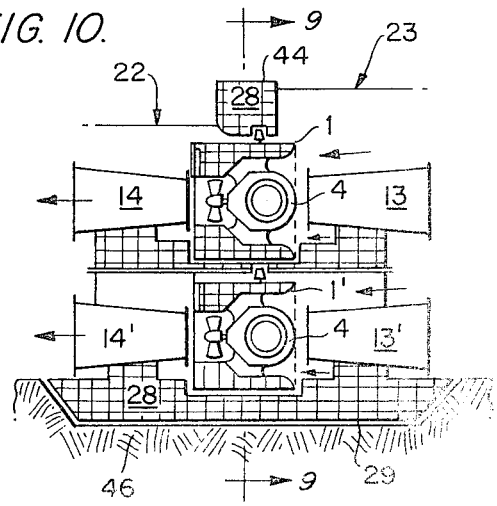
FIG. 3.
FIG. 4.
FIG. 10.
FIG. 9.

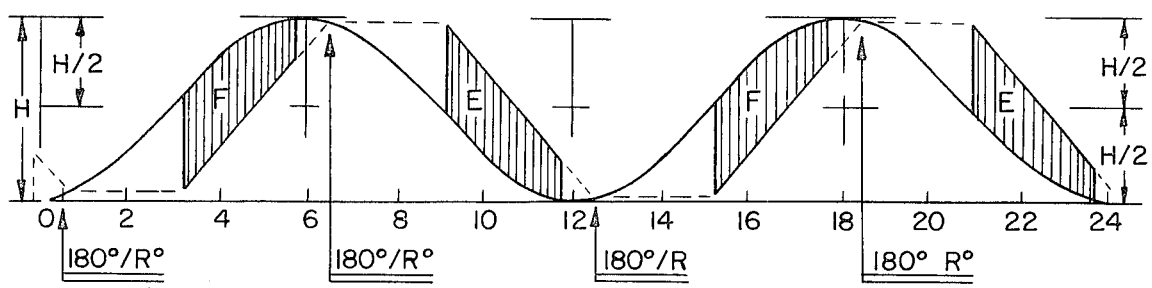
FIG. 5A.
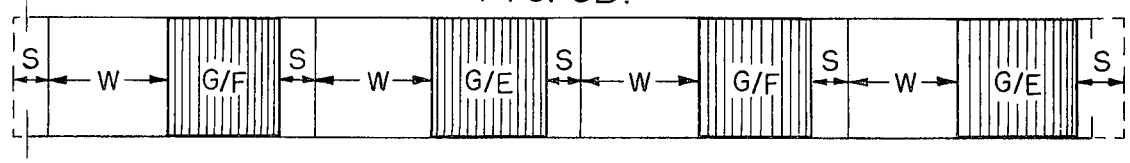
FIG. 5B.
FIG. 6A.
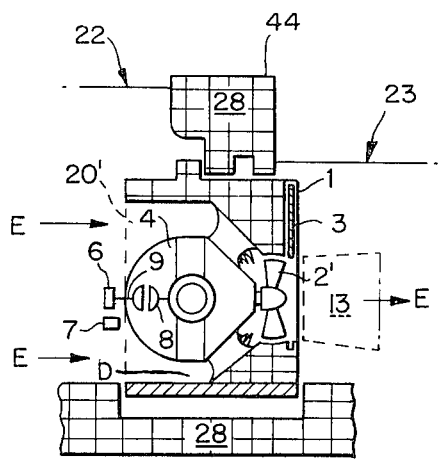
FIG. 7A.
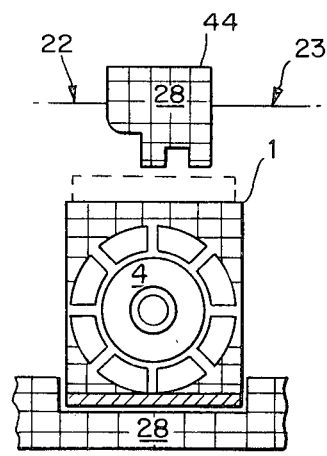
FIG. 8A.
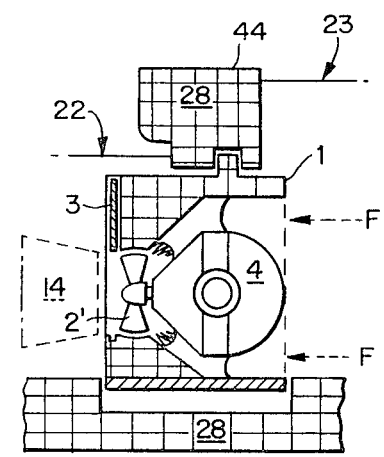
FIG. 6B.
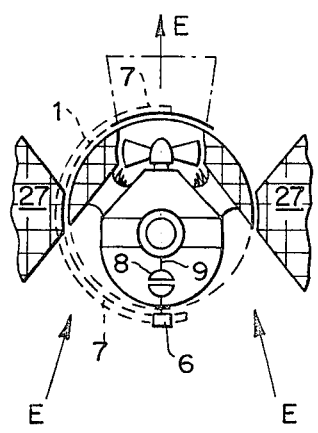
FIG. 7B.
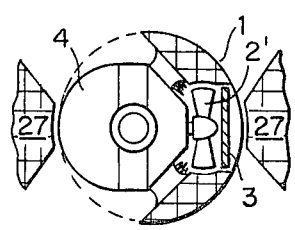
FIG. 8B.
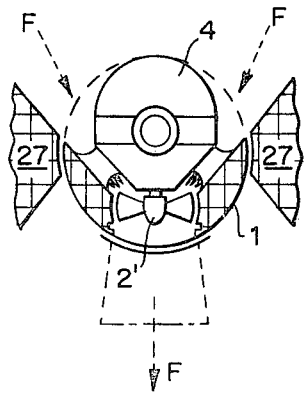

SYMMETRIC TIDAL STATION

This invention relates to a power generation installation and more particularly to an improved portable, symmetrical tidal station comprising a displaceable power pack body or hydromotive assembly containing a turbine/generator rotor and a shiftable gate with operative means for starting and stopping the turbine/generator rotor.

The compact, simplified arrangement of the instant components particularly lends itself to utilization in tidal power projects wherein the ambient conditions existing at coastal sites will be understood to be quite agressive. On the other hand, it will be appreciated that the concept of the present invention may also be employed at hydroelectric plants or at low-head pumped storage installations.

This invention represents an improvement over the disclosure found in several of my prior patents including U.S. Pat. No. 4,159,188 of June 26, 1979; U.S. Pat. No. 4,170,428 of Oct. 9, 1979; U.S. Pat. No. 4,207,015 of June 10, 1980 and U.S. Pat. No. 4,261,171 of Apr. 14, 1981.

With the present arrangement, the best features of the above prior art are utilized in a unique manner resulting in a dam installation providing numerous advantages. No machine hall is required in the associated caissons. The hydromotive assemblies are constructed and after a period of service are subsequently overhauled at a remote service center. A desirable inertia constant is achieved by the horizontally disposed generator rotor falling within the parameters of those generators normally contained in vertically disposed hydroelectric sets. The simplified, rugged construction is well suited to the agressive nature of the environment normally associated with tidal stations while exhibiting excellent efficiency at both the ebb and flood stages of a tidal cycle while utilizing an independently self-transportable power pack body. These and other features have been combined to provide an installation which may be expected to extract more energy during a tidal cycle and with less financial investment, than any installation known heretofore. A guide line offered by published studies concerning tidal installations envisions the production of 22, 500 kW power per square kilometer of the basin, assuming a tide amplitude of 10 meters. However, with the present construction it is possible to secure a power output of 35,000–40,000 kW/km$^2$ with the same tide amplitude of 10 meters, an improvement of nearly two to one.

The current hydromotive assembly preferably utilizes a turbine having fixed propeller blades and also contains a distributor formed of fixed vanes, an arrangement which in itself results in a lower cost for the tidal plant and also involves lower maintenance expense without the loss of any power or energetic output. This construction is entirely suitable in a tidal installation since sufficient water and fluid flow is always available at every head and the hydromotive assembly can always operate advantageously with the result of fully opened runner blading. Supporting the foregoing condition is the present use of a hydromotive assembly wherein the generator is provided with a rotor having a large diameter relative the diameter of the turbine such as is disclosed in the above referenced U.S. Pat. No. 4,207,015. In any case, large runner diameters are favored in a tidal station and may reach 10 meters or greater. The economical status of an installation is greatly affected by the number of hydromotive units utilized and thus it is more economical to build each machine as large as possible. With the instant arrangement, this is accomplished by enlarging the power output per machine which translates as a reduced rotational speed which is favorable for tidal power units due to the low operating heads. The greatly increased diameter of the generator rotor versus the diameter of the turbine rotor will be understood to result in a reduced generator length leading to a far more compact assembly leading to lower temperature increments of the generator's conductors and simplified air-cooled means. These features produce a higher electrical efficiency and improved power factors over existing capsulated generators.

A most noteworthy advantage of the present invention involves the high inertia factor which is quite desirable in a large power station and which leads to vastly improved stabilization in the connected electrical network as the network may be economically constructed to eliminate costly compensating features such as synchronous condensers and the like.

It will be appreciated that tidal power units are especially subject to very heavy and rough operation due to not only to pressure fluctuations caused by wave motion but also due to the fact that a tidal unit is rarely exposed to the optimum hydraulic operational range but instead is exposed to daily sequences of extreme conditions of varying flows producing power output fluctuations. The present arrangement definitely assists in dealing with the foregoing observations. A further advantage of the present invention concerns energy recovery with draft tubes or diffusers and heretofore it has been very difficult to design an efficient diffuser arrangement for use in a tidal power station in view of the inherently low-head environment wherein the hydraulic heads range between approximately 1.5–10 meters. It is acknowledged that the most efficient hydraulic performance is achieved with horizontally disposed diffusers without any bends and the optimum arrangement comprises a horizontally disposed diffuser having a length ten times the diameter of its intake, a parameter extremely difficult to fulfill with known tidal power stations.

With the present invention, a set of two fixed diffusers are selectively utilized in the direct ebb tide cycle or in the indirect flood tide cycle, respectively. This concept departs from that as disclosed in my earlier U.S. Pat. Nos. 4,159,188 and 4,261,171 wherein displaceable diffusers were envisaged and intended to be employed in power stations erected in protected areas such as bays, inlets and the like but the most likely location for tidal stations comprises areas more noticeably exposed to the agressiveness of the seas and accordingly, the presently proposed dual, fixed diffuser arrangement will be highly desirable.

Although the instant diffusers are fixedly disposed relative the remaining components of the dam installation throughout its functioning in all modes, it will be appreciated that one or both of these diffusers are of the replaceable type such as disclosed in my earlier U.S. Pat. No. 4,073,146 issued Feb. 14, 1978. With this replaceable feature, the selection of water flow velocity at the draft tube exit may be made on the basis of energy loss. Until now, once a draft tube is constructed in concrete and a turbine runner conduit is defined in steel, it has been impossible to make them larger in the future.

The current invention, on the other hand, readily permits future adjustments, either in the diffuser geometry or in the motive turbine characteristics, which manipulation is not possible with existing assemblies. The mere use of high specific speed turbine runners is actually considered a step backwards rather than forward in the art, unless the draft tube geometry is lengthened and the exit area enlarged, which latter requirements are met by the present invention. With the proposed two fixed diffusers, full advantage is taken of a symmetric double tide energy cycle, that is, wherein both the ebb and flood tides are utilized to obtain a 38,500 kW per square kilometer output with a 10 meter tide amplitude compared with an output of merely 22, 500 kW per square kilometer obtainable with existing installations.

A further aim of the present invention is to provide a portable caisson construction as suggested in the current Greenup project on the Ohio river. However, with my proposal, the dam supporting structure comprising caissons is formed with a plurality of hermetic compartments or chambers adapted to be filled with ballast means such as iron ore, sand etc. which is introduced and extracted by any suitable pump means. In this manner, the structural dam supporting means is entirely of a portable nature and may be erected initially at one site and later transported to another site. One advantage of this portable feature is that an extremely large tidal power station may be planned in stages wherein a plurality of relatively small stations are individually constructed while regional electrical networks and financing are developed after which the individual stations are ultimately easily relocated in view of their portability to a single new large tidal station incorporating all of the plurality of individual units. The economics of the present invention is further enhanced by the substitution of an all-steel construction which not only accelerates the fabrication time of an installation but also eliminates costly complicated forms required when manufacturing the components of concrete.

Another object of the present invention involves the utilization of the components of the tidal station itself as the motive and control means for transporting the components to and from an installation site. Until the present invention, tugs or conventional self propulsion units have been used but in the case of a tidal station, it will be understood that the entire sinking operation must be performed during a relative short slack water period wherein position control and sinking rate are quite critical. Prior methods are virtually eliminated for use in a tidal installation due to the risk of mechanical failure and the fact that it is unlikely that position control accuracy during sinking will be better than plus or minus 0.3 meters. The present method involves a plurality of hydromotive assemblies or power packs which are fitted within their respective caisson components with their power packs angularly disposed so as to provide self-maneuverability of the caisson assembly. Appropriate electrical generating means is carried on the assembly and provides power for operating the power back generators as motors which in turn rotate the connected turbines as propellers. A removable gate included in each hydromotive assembly is controllably displaced to provide means to regulate the tractive or pushing effort of the portable tidal station assembly. Not only can the above described arrangement be employed for maneuvering a tidal station assembly at the actual intended site but in view of the large tractive energy available from such an arrangement, it will be appreciated that the same procedure may be utilized also as navigation means for transporting the complete assembly between a shipyard and the site. Critical positioning of the caissons is facilitated by the inclusion of underwater thrusters.

A side benefit attainable with the foregoing described objective of this invention involves greatly facilitated storage of power packs and caissons intended to be installed at a later date at a selected site. Utilizing the portability feature, power pack and caisson assemblies may be transported and sunk at points nearby their ultimate point of installation and such temperature locations may comprise the mouth of small inlets, bays or harbors following which, during the next calendar period inducive to transport by navigation, the assemblies are relocated to their permanent tidal station site. Quite obviously, while in the temporary storage location, advantage can be taken of any existing water currents by operating the stored assemblies to obtain at least nominal amounts of power output.

The foregoing portability readily lends itself to the installation of an entire power plant in a matter of weeks versus years as required for conventional installations. This is accomplished by utilizing long caissons of all-steel construction each approximately 300 meters long and which may be sited with a degree of vertical and horizontal accuracy in view of the controllable maneuerability of the present units.

Another object of the present invention is to provide an improved tidal station comprising but three primary displaceable elements including a rotatable power pack or hydromotive assembly body, a rotatable turbine/generator axle and a shiftable downstream gate in the power pack body. Absent are turbines with movable blades, distributors comprising movable vanes, displaceable gates at the dam and displaceable diffusers among other items.

With these and other objects in view which will more readily appear as the nature of the invention is better understood, the invention consists in the novel construction, combination and arrangement of parts hereinafter more fully described, illustrated and claimed.

FIG. 1 is a transverse vertical sectional view taken along the longitudinal axis of the caisson and illustrating the rotatable power pack body as positioned for ebb tide generation;

FIG. 2 is a horizontal sectional view of the structure of FIG. 1 taken along the line 2—2 of FIG. 1;

FIG. 3 is a top plan view, partly in section, illustrating a manner of transporting a caisson from shipyard to site with two tractive power pack sets aboard;

FIG. 4 illustrates the caisson of FIG. 3 as it appears during positioning sequence at a site;

FIG. 5A is a vertical view of a graph depicting the symmetric double effect tidal cycle resulting from the present invention during a 24-hour period;

FIG. 5B is a top plan view of the graph of FIG. 5A;

FIGS. 6A-6B, 7A-7B and 8A-8B are vertical and horizontal views, respectively illustrating the three positional stages of the rotatable power pack body as shifted from ebb tide to flood tide cycles;

FIG. 9 is a longitudinal sectional view of a multistage tidal station;

FIG. 10 is a transverse vertical sectional view taken along the line 10—10 of FIG. 9;

Similar reference characters designate corresponding parts throughout the several figures of the drawings.

Figure 11:
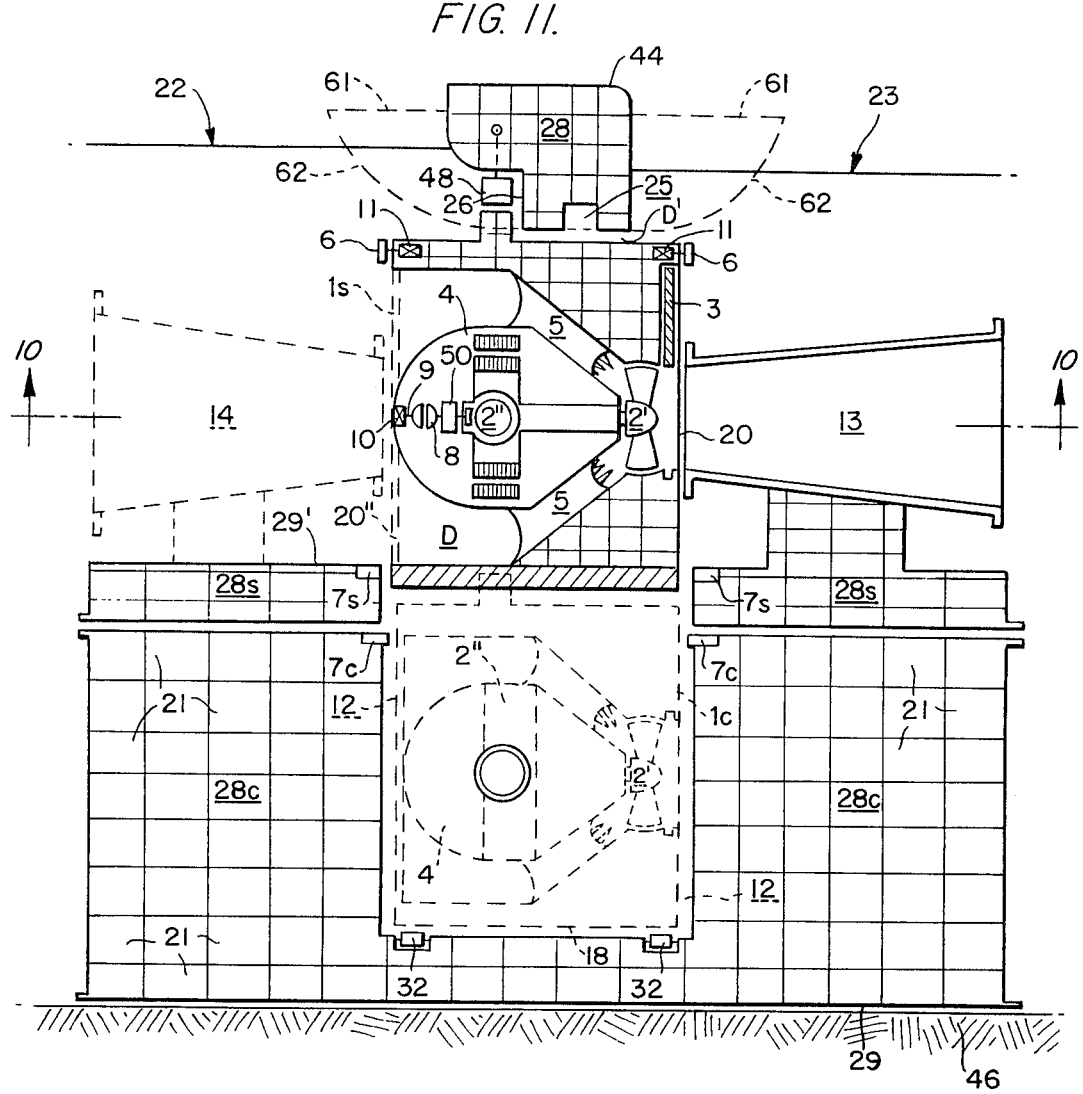
FIG. 11 is a transverse vertical sectional view of an alternative full-sluice type tidal station.

As shown most clearly in FIGS. 1-2 of the drawings, the tidal station of the present invention includes a hydromotive assembly or rotatable power pack body 1 which is circular in horizontal configuration and which contains a generator set hermetic capsule 4 housing a generator 2″ mounted upon an axle to which is affixed a turbine rotor 2′ comprising fixed blades. The only remaining primary movable component of the tidal station comprises a displaceable gate 3 utilized principally during the starting procedure. The generator set capsule 4 is solidly attached to the remainder of the power pack body 1 by a stay ring 5 which serves as a fixed distributor and the periphery of the capsule 4 will be seen to be inwardly spaced from the remainder of the body 1 to form therebetween a power pack conduit D having an inlet 20′ at one end and an outlet 20 at the opposite end adjacent the turbine runner 2′. Both openings 20,20′ are preferably circular although alternatively, the intake 20′ may be annularly defined.

It will be understood that preferably a plurality of the assemblies 1 are utilized in an adjacent fashion to form a tidal station. In any case, regardless of the number of assemblies 1, each is supported by a caisson, generally designated 28 and which includes a lower support body 29, laterally spaced vertical pillars 27 and upper damming member 44 atop the pillars. Between each pair of pillars 27—27 a circular pit 12 is formed in the lower support body 29 of the caisson. When the power pack body 1 is removed from the position such as shown in FIGS. 1 and 2, a sluice-type conduit D′ will be understood to be formed between the lower face 47 of the upper damming member 44, the pit 12, and between the curved lateral supporting portions 27′—27′ of each two adjacent pillars 27—27.

Although the caisson 28 is described as being constructed of steel for reasons heretofore enumerated, it will be appreciated that the basic concept of the present invention may be followed even if the caissons are constructed of concrete, either pre-stressed or armored and in either case, they may be of the recoverable type or of the non-recoverable type.

The caisson 28 is portable in view of the formation of a plurality of cellular bulkheads defining chambers 21 of the hermetic type adapted to accept ballast means such as sand, boulders, iron ore, crushed stone or the like, capable of being introduced by water or other means and removed from the chambers by the same means. In this manner, a complete caisson 28 can be ballasted or deballasted in a very short time. The respective power pack bodies 1, likewise containing hermetic chambers 21′, may be independently shifted into or away from the position as shown in FIGS. 1 and 2 of the drawings.

This relative displacement between the bodies 1 and the caisson 28 may be accomplished during the transport of the floatable caissons, during the positioning of same at a site or after locating a caisson upon a prepared geological bed 46 within which the lower support body 29 of the caisson is adapted to be disposed.

Located within the basin side water body 22 is a removable diffuser 14 having support means 31 disposed atop the upper face 29′ of the caisson lower body 29. Reference to the diffuser 14 as being of the removable type is not to mean that this diffuser is displaceable during operation of the tidal station. On the contrary, this diffuser remains fixed in the illustrated position at all times during active generation status of the power pack body 1. On the other hand, a permanently affixed diffuser 13 will be seen to be located in the sea side water body 23 and is preferably formed as an actual part of the caisson lower body 29, being joined thereto by an intermediate support body 30. This integral construction involving a diffuser 13 is intended to resist storms and acts as a breakwater means resisting wave action during the most strenuous of weather conditions.

The tidal station of this invention utilizes a symmetrical double effect tidal cycle in a single basin installation by taking full advantage of the sinusoidal waves for the tide cycles as depicted in FIGS. 5A-5B wherein it will be seen that for each daily period, there are four electric generation cycles, each lasting approximately three hours or so. In these two graph figures, the shaded area therein designates the electric generation cycles both during the flood and ebb tides as represented by "F" and "E" respectively. Such a total generation period for any daily tide cycle has not been possible with tidal stations employed to date and the operation of the arrangement such as depicted in FIGS. 1-2 which leads to the above power generation capability will now be described.

First, it will be realized that throughout the entire ebb direct generation tidal cycle and thoughout the entire flood indirect generation tidal cycle, the two diffusers 13-14 are fixed as shown in the drawings. The sea side diffuser 13 includes an inlet 17 receiving water flows ejecting from the power pack conduit C at its outlet 20, at speeds from 9 m/sec. or so while the diffuser outlet 15 permits these waters to exit at only 1.5 m/sec. Thus, the area of the diffuser outlet 15 will be seen to be many times greater than the area of the outlet 17 (up to about 10 times). Appropriate sealing means 33 are provided around the diffuser inlet 17 or alternatively, the power pack body outlet 20, to avoid the penetration of gases during the ebb cycle as water from the basin side 22 is directed to the sea side 23 in the direction of the arrow 23′ in FIGS. 1-2.

The basin side diffuser 14 is provided with an inlet 19 to accept water flows 22″ emerging from the power pack body conduit C during a flood tide cycle. During this latter condition, the power pack body 1 will be understood to be rotatably shifted 180 degrees from the views of FIGS. 1-2 in a manner to be described hereinafter. The basin diffuser 14 further includes an outlet 16 likewise provided with an area of about ten times greater extent than that of the inlet area 19. Also, sealing means 33 are provided around the diffuser inlet 19 or alternatively about the power pack body outlet 20 for closing off these juxtaposed openings when the assembly 1 is in the flood tide cycle.

The basin side diffuser 14 and/or its support 31 may be removed from its position atop the caisson lower body surface 29′ for overhauling or replacement thereof by inducing flotation therein in the manner as proposed in my earlier U.S. Pat. No. 4,073,146.

Because of the magnitude of the diameter of the generator's hermetic capsule 4 relative the diameter of the turbine runner 2′, the basin side diffuser inlet 19 is practically fully blocked when in the ebb mode and accordingly, it will be understood that during the ebb cycle, incoming flows 22′ from the basin side 22 are directed to the inlet 20′ of the power pack conduit C by displacement around the diffuser body 14 as shown in the arrows 22′ in FIGS. 1-2. On the other hand, all of the basin side flows 22' which emerge from the power pack body 1 as flows 23' after inducing actuation of the generator set, enter the sea side diffuser 13 and are exhausted from its outlet 15. This cycle is initiated upon the opening of the displacement gate 3 carried by the power pack body 1 adjacent its outlet 20, once an appropriate head has developed between the basin side level 22 and the lower sea side level 23 on opposite sides of the upper damming body 44. An important feature with the instant arrangement is that the foregoing operation transpires without the need of any gates associated with the caisson 28.

The water flowing as above described through the hydromotive assembly 1, produces an hydraulic thrust on the power pack body 1 against the dam or caisson 28. This thrust is laterally supported by the vertical walls 27' of the pillars 27, is upwardly supported by an extension member 24 on the top of the power pack body acting against a face 26 on the upper damming member 44 and is downwardly supported by the sea side faces of the circular pit 12 beneath the lowermost part 18 of the circular power pack body. In this use position, the power pack body lower part 18 will be seen to be slightly submerged within the confines of the pit 12. This disposition is maintained by a rotatable beam 48 pivotally attached to the upper damming member 44 by radial arms 49 and which may be alternately positioned to an out of the way location 48' by suitable lifting means 51—51'.

The initial installation of the power pack body 1 will be readily understood in view of the above described structure. With the basin side diffuser 14 and its support 31 previously removed, hermetic chambers 21' of the power pack body 1 are employed to induce controlled flotation of the body 1 while it is horizontally displaced until the outlet 20 is juxtaposed the sea side diffuser inlet 17 at which point the beam 48 is lowered about its center pivot 52 and the body 1 has been slightly lowered into the pit 12.

Clamping of the power pack body into its use position is thereafter obtained by inducing an upward displacement thereto so as to urge the top extension member 24 against the lower face of the beam 48. If this position is maintained during the generation and sluice sequences, it will be understood that generation occurs upon opening of the gate 3 and lasts until the head is exhausted down to approximately 1.0-1.5 meters or so. At that point, the electric generator 2" is disconnected from the electrical network and the sluice sequence begins and continues until the head is nearly exhausted down to approximately 0.05 meters. At this point, the hydromotive assembly or power pack body 1 is rotated 180 degrees about its vertical central axis 43. To achieve this rotatable displacement, the lower portion 18 of the body 1 is displaced into the pit 2 until it rests upon roller means 32 therein at which point, wheels 6 carried by the body 1 engage running surface 7 disposed around the edge of the pit 12 as shown most clearly in FIG. 1 of the drawings. The downward displacement of body 1 is readily achieved such as by ballasting the hermetic chambers 21' therein.

In view of the extremely heavy construction of the instant tidal plant, unique means are necessary for accomplishing the rotatable displacement of the body 1. To this end, it is proposed to utilize the heavy flywheel effect and moment of inertia of the slowly rotating masses of the generator rotor 2" which exists at the end of the sluice cycle (6-9 rpm or so). In this respect, an extension 9 of the generator axle may be joined to the wheel means 6 with intermediate clutch means 8 whereby at the start of the body rotation sequence, such clutch means 8 delivers rotation of the axle extension 9 to the wheels 6 and disconnects same once the power pack body 1 has been angularly displaced 180 degrees. Transfer of this motion may be accomplished through one or more of the supports 20" joining the capsule 4 to the remainder of the body 1. For a quicker rotating sequence and for heavier hydromotive assemblies, hydraulic-type transmissions are suggested. A rotatable multiplier box 50 is included along the axle extension 9 and works through the clutch 8 to drive a hydraulic pump 10 at a high speed (1000 rpm) which supplies torque to a plurality of hydraulic motors 11 each connected to one of the motive wheels 6 engaging the surface 7. The hydraulic motors 11 and wheels 6 will be seen from FIG. 1 to be disposed within the power pack body 1 adjacent the intake and outlet ends 20'—20 thereof near the bottom 18.

When the power pack body 1 is lowered into the pit 12, the structural extension member 24 becomes disengaged from the upper damming member face 46 and this allows the extension member 24 to pass beneath the lower face 47 of the upper damming member 44 from the position of FIG. 6A through the position of FIG. 7A to that of FIG. 8A. Once rotation starts from the position of FIG. 6A, the gate 3 is slowly closed such that it is 70-80% closed when the structure is at the 90 degree position of FIGS. 7A-7B. This prevents a reverse flow of water into the outlet end 20 which now begins to face the basin side. Once the complete 180 degree displacement has been accomplished, the assembly will appear as in FIGS. 8A-8B and the gate is then slightly opened to allow a reverse flow 22'-23' to enter the body outlet 20 and induce a reverse torque in the turbine 2'. This quickly stops the generator rotor 2" and it is clamped by suitable securing means (not shown) to the surrounding structure. It will be seen that the present concept, no costly mechanical braking means are required to stop the rotating mass of the rotor, which braking is essential to preclude damage to the bearings.

With the body intake opening 20' facing the sea side 23, and the outlut 20 combined with the intake 19 of the basin diffuser 14, the gate 3 is fully closed and the hydraulic head begins to develop slowly between the levels 23/22 as supported by the caisson damming body 44. In this alternative position, hydraulic thrusts on the power pack body 1 are now supported by disposition of the extension member 24 within a slot 25 formed in the lower face 47 of the upper damming member 44. Necessary flotation is induced in the body chambers 21'to insure firm seating of the extension member 24 within the slot 25. After a suitable hydraulic head develops, gate 3 is opened and the water flow entering the open end 20' operates upon the turbine blades 2' and generator 2" begins rotation until it is synchronized with the electrical network and induces actuation thereof. At this point, the capsule face 4 nearly fully blocks the entrance 17 of the sea side diffuser 13 and incoming flows 23" arriving from the sea into the depleted basin, are directed to the inlet 20' of the power pack 1 not only through the diffuser body 13 but primarily outside and bypassing the diffuser 13 and into the enlarged conduit D during the flood tide cycle. The referenced sealing means 33 surrounding the intakes 17 and 19 in the two diffusers may comprise elastic and resilient inflatable/-deflatable members and will be understood to preclude the introduction of gases into the flows 23' at ebb tide and 22" at flood tide.

With the present arrangement, it is proposed to provide each generator 2" with its own transformer 41 within the power pack body 1 and which will serve to raise the generated voltages up to the standard transmission level of approximately 132,000–230,000 volts. Communicating with this self-contained assembly is a flexible electrical coupling connection 43 along the vertical center line of each power pack body 1. Preferably, the transformers 41 are installed near the bottom 18 of the respective units 1 thereby assisting in the navigation status of the units due to the added ballast effect to the unit 1.

The assemblies such as shown and described herein readily lend themselves to portable disposition not only from the shipyard to a site but also during the actual positioning at a site. These arrangements respectively illustrated in FIGS. 3 and 4 of the drawings wherein it will be seen that two or more power pack bodies 1 in combination with their respective caisson structure are configured for ready maneuvering during navigation and/or positioning. In the navigational transport mode as shown in FIG. 3, at least two power pack bodies 1 are angularly disposed with respect to the diffusers 13-14 and symmetrically aligned with respect to the axis of displacement represented by the pushing effor RN which latter effort results from the combined efforts of the vectors RN1,RN2 of the two power pack units 34,34' respectively. The generators 2" of each power pack are driven as motors by means of a suitable gas turbine or diesel electric generator 37 mounted in the upper part of the structure 35' adjacent a drag reducing temporary bow section 35. In this manner, the generating apparatus 37 actuates the power pack generators 2" as motors which in turn drive the turbines 2" as propellers to move the floating assembly to the site of the tidal station. Underwater thrusters 53 at the bow and stern assist in providing additional maneuverability while a stern section 39 and complementary stern body 39' further aid in reducing drag. Additional drag is precluded by the inclusion of complementary sections 40—40 between the diffusers 13 and 14. Upon arrival at the station site, the bow and stern sections 35,39 are removed from the caisson structure 28 and the caisson assembly appears as in FIG. 4, ready for positioning. In this latter figure, the two power pack bodies 1—1 are illustrated respectively disposed in alternate positions 36—36' but it will be realized that all assemblies will be disposed in the position 36 at flood cycle and in the position 36' at ebb cycle. In any case, the generating device 37 is retained to assist in driving the units 1 for precise positioning of the station.

The arrangement shown in FIG. 4 may be used in combination with other similar power pack equipped caissons and by selectively positioning the power pack units 1 of the plurality of caissons, optional directional thrusts are achieved depending upon the existing currents encountered. Once a particular caisson 28 is sunk into position upon its prepared foundation bed 46, the contained power pack units 1 may be removed therefrom as previously described, thereby improving the sluicing capability of the caisson, while the removed power pack units are subsequently utilized to transport and/or position other caisson structures until all caissons forming an installation have been positioned.

The multi-stage symmetrical tidal station as shown in FIGS. 9-10 of the drawings finds particular merit in installations involving irregularly configured sea bed contours, including large depths at intake channels leading to inlets, bays, harbors etc. In this embodiment, the caissons C are of substantially greater height than those of the previous embodiment and include two or more horizontal rows of power pack units 1—1' situated within a deep dredged trench 45 which was necessary in order to remove faulty overburden and reach a suitable seabed foundation 46. In FIG. 9, the caisson body C includes an upper row of four power pack units 1, each between diffusers 14-13 and a lower row having two adjacent power pack units 1', each between diffusers 14'-13'. These units 1 and 1' are between the upper body 44 and lower body 29 of the caisson C and may be sandwiched between adjacent caissons C' and C" the latter two of which, may be similar to that as described in connection with the embodiment of FIGS. 1-2. The central caisson C may comprise one integral body or alternatively a stacked arrangement comprising a first body having the lower units 1' and an upper body comprising the other row of plurality of units 1.

Figure 12:
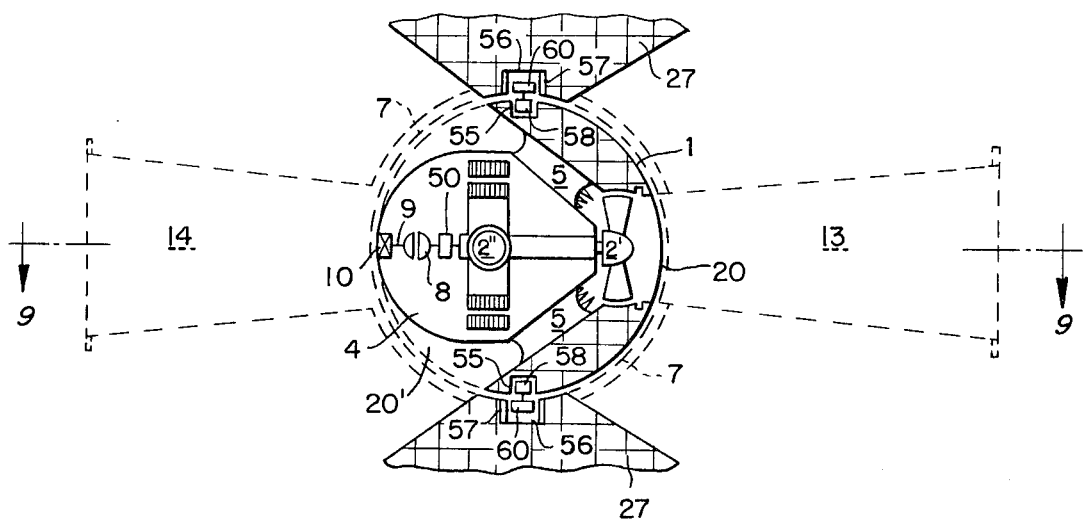
FIG. 12 is a partial horizontal sectional view taken along the line 12—12 of FIG. 11.

Another embodiment of the present invention is shown in FIGS. 11-12 which illustrates a combined generation-sluice tidal station wherein the power pack bodies 1 are displaceable from a pure generation status both at the ebb and flood cycles, into a pure gate status during the sluice cycles with the referenced gate status having the capability to fully open the sluice conduit D' in the caisson. This transformation is achieved by providing means whereby the power pack body 1 may be displaced from the elevated generating position 1s to the lowered fully removed position 1c so that the sluice capacity area will be increased greater than 10 times. Sinking/flotation of the unit 1 is accomplished by utilization of the hermetic chambers 21' therein in combination with guide/drive means between the periphery of the power pack body and the two adjacent vertical pillars 27—27. As shown in FIG. 12 of the drawings, the pillars 27 are provided with slots 56 having running surfaces 57 at both sides thereof while the opposed surface of the power pack body is provided with outwardly ejectable bodies 58 normally housed within recesses 55 with these bodies provided with roller means 60 engageable with the pillar surfaces 57. Quite obviously, the ejectable bodies 58 are fully masked within the power pack body recesses 55 each time the power pack is rotated when in the elevated or lowered positions. During the sluicing period, the power pack body 1c will be seen to be fully disposed within the pit 12 with its bottom surface 18 resting upon the guide rollers 32 on the pit bottom. In this embodiment, the motive rollers 6 and the associated hydraulic motors 11 are located adjacent the top portion of the power pack body with the rollers 6 engaging the surfaces 7c. The lower caisson body is shown including an upper portion 28s preferably of the portable type and made of steel and a lower portion 28c preferably made of concrete and being affixed to the sea bottom 46 and thus, of the non-portable type. The uppermost surface 7s would be utilized for the previously described rotary displacement of the power pack bodies.

At both sides of the upper damming portion 44, a set of two outlined surfaces 61-62 are provided to smooth out sluice flows by producing a semi-venturi type sluice conduit D'. These surfaces 61-62 are of the removable type.

I claim:

1. A tidal station including a caisson having a fluid flow conduit therethrough communicating with the basin and sea sides of said caisson, a hydromotive assembly within said conduit and disposed substantially symmetrically respective said caisson, said hydromotive assembly provided with a fluid flow conduit therethrough having opposite intake and outlet open ends, a turbine/generator set within said hydromotive assembly conduit, a first diffuser affixed to said caisson on one side thereof and having an inlet juxtaposed one said hydromotive assembly conduit open end, a second diffuser fixedly attached adjacent the opposite side of said caisson and having an inlet juxtaposed another one said hydromotive assembly conduit open end, said two diffuser inlets symmetrically disposed relatively said hydromotive assembly and means displacing said hydromotive assembly between selected positions alternatively positioning said hydromotive assembly conduit intake and outlet juxtaposed alternate ones of said first and second diffuser inlets to actuate said turbine/generator set during both ebb and flood tides.

2. A tidal station according to claim 1 wherein, at least one of said diffusers is removable from said caisson.

3. A tidal station according to claim 2 wherein, said first diffuser is disposed on the sea side of said station caisson, said second diffuser disposed on the basin side of said station caisson, and said hydromotive assembly displacing means rotates said hydromotive assembly about a vertical axis substantially coincident with the symmetric vertical plane through said caisson.

4. A tidal station according to claim 3 wherein, said sea side first diffuser is integral with said caisson, said hydromotive assembly as it is rotatably displaced between alternate positions sequentially performing in an energy generation mode at ebb tide, sluicing at ebb tide, energy generation mode at flood tide and sluicing at flood tide, and a displaceable gate in said hydromotive assembly adapted to progressively open and close said hydromotive assembly conduit outlet open end.

5. A tidal station according to claim 3 wherein, said hydromotive assembly is rotated to position its intake open end to the sea side juxtaposed said first diffuser inlet during a flood tide, said hydromotive assembly rotatable 180 degrees to position its intake open end to the basin side juxtaposed said second diffuser inlet during an ebb tide and said hydromotive assembly rotatable through an intermediate 90 degree position whereby said caisson conduit is substantially closed.

6. A tidal station according to claim 3 wherein, said hydromotive assembly displacing means includes motion transmitting means connectable to said turbine/generator set to utilize the flywheel effect and inertia of said rotating turbine/generator set to rotate said hydromotive assembly.

7. A tidal station according to claim 6 wherein, said motion transmitting means includes a gear box driven by said turbine/generator set, a clutch connected to said gear box, a hydraulic pump joined to said clutch and driving a plurality of hydraulic motors, roller means engaged by said motors and circularly defined around said hydromotive assembly, and support surfaces circularly disposed upon said caisson engageable by said roller means.

8. A tidal station according to claim 1 including, means mounting said hydromotive assembly within said caisson, said mounting means including a cylindrical pit within said caisson, said caisson including a pair of vertical pillars laterally of said pit each having a curved face juxtaposed said hydromotive assembly, said caisson provided with an upper damming member spanning said pillars atop said hydromotive assembly, and cooperating elements on said hydromotive assembly and upper damming member alternately engageable as said hydromotive assembly is displaced between said selected positions.

9. A tidal station according to claim 8 including, hermetic chambers within said hydromotive assembly adapted to receive and eject ballast means whereby, said hydromotive assembly may be alternately lowered and raised within said pit.

10. A tidal station according to claim 1 including, hermetic chambers within said caisson adapted to receive ballast means and to be deballasted whereby, said caisson and hydromotive assembly may be transported by navigation.

11. A tidal station according to claim 1 including, a plurality of laterally adjacent said hydromotive assemblies disposed within a common one said caisson.

12. A tidal station according to claim 10 including, at least two said hydromotive assemblies in a common one said caisson each disposed between one said first and second diffuser, an electric generator coupled with said hydromotive assembly generators to operate same as motors whereby said turbines turn as propellers, said hydromotive assemblies angularly disposed to produce a net tractive force propelling said station in a desired direction in a navigational mode.

13. A tidal station according to claim 12 including, underwater thrusters to compensate for any unbalance of said tractive force and complementary temporary members attached to said caisson to minimize drag.

14. A tidal station according to claim 11 including, a plurality of rows of said hydromotive assemblies all having their central vertical axes extending through a common vertical plane disposed symmetrically of said caisson.

15. A tidal station according to claim 14 including, at least a single one said hydromotive assembly laterally adjacent the endmost hydromotive assemblies of topmost row of said plurality of rows of hydromotive assemblies.

16. A tidal station according to claim 9 wherein, said pit is of a depth sufficient to fully contain said hydromotive assembly when lowered therein.

17. A tidal station according to claim 16 including, roller means projecting from the lateral periphery of said hydromotive assembly, roller surfaces in said pillar curved faces receiving said roller means from said hydromotive assembly whereby, displacement of said hydromotive assembly vertically into and out of said pit is controllably guided by engagement between said roller means and roller surfaces.

18. A tidal station according to claim 17 wherein, said roller means are retractable within said hydromotive assembly when vertical displacement of said hydromotive assembly is not desired.

19. A tidal station according to claim 17 including, motor means driving said roller means.

20. A tidal station according to claim 19 including, power means for driving said motor means, said power means derived from the flywheel effect and inertia of said turbine/generator set.

21. A tidal station according to claim 20 wherein, said power means includes hydraulic transmission means.

22. A tidal station according to claim 1 including, a flexible electrical connection between said hydromotive assembly and caisson, and said hydromotive assembly having a transformer therein.

23. A method of operating a tidal station having a caisson provided with a conduit therethrough communicating with the basin and sea sides of the caisson, comprising the steps of; providing a sea side diffuser affixed to said caisson with its inlet adjacent said conduit, placing a hydromotive assembly containing a turbine/generator set within said conduit from the basin side of said caisson, installing a basin side diffuser upon said caisson with its inlet adjacent said conduit, said hydromotive assembly provided with a conduit surrounding said turbine/generator and having opposite intake and outlet open ends, said hydromotive assembly and two diffuser inlets symmetrically disposed relative said caisson, motor means within said hydromotive assembly operable to rotate said hydromotive assembly about a central vertical axis, actuating said motor means to rotate said hydromotive assembly to juxtaposition said outlet and sea side diffuser inlet prior to ebb tide whereupon during ebb tide, said hydromotive assembly produces power as basin water enters said intake and exits said outlet into said sea side diffuser inlet, after reaching a low head condition actuating said motor means to rotate said hydromotive assembly 180 degrees to juxtaposition said outlet and basin side diffuser inlet whereupon during subsequent flood tide said hydromotive assembly produces power as sea water enters said intake and exits said outlet into said basin side diffuser inlet.

* * * * *